United States Patent [19]
Cipolla et al.

[11] Patent Number: 6,097,596
[45] Date of Patent: Aug. 1, 2000

[54] PORTABLE COMPUTER ROTATIONAL HEAT PIPE HEAT TRANSFER

[75] Inventors: Thomas Mario Cipolla, Katonah; Lawrence Shungwei Mok, Brewster, both of N.Y.

[73] Assignee: International Business Machines Corporation, Armonk, N.Y.

[21] Appl. No.: 09/023,008

[22] Filed: Feb. 12, 1998

[51] Int. Cl.[7] .................................. G06F 1/20; H05K 7/20
[52] U.S. Cl. .................. 361/687; 361/700; 174/15.2; 174/17 VA; 165/104.33; 165/185; 62/259.2; 16/223
[58] Field of Search ...................... 361/687, 683, 361/698, 699, 700, 704, 707; 165/80.3, 80.4, 104.33, 185; 62/259.2; 364/708.1; 174/15.2, 17 VA; 16/223

[56] References Cited

U.S. PATENT DOCUMENTS

| | | | |
|---|---|---|---|
| 5,313,362 | 5/1994 | Hatada et al. | 361/709 |
| 5,588,483 | 12/1996 | Ishida | 165/86 |
| 5,621,613 | 4/1997 | Haley et al. | 361/687 |
| 5,646,822 | 7/1997 | Bhatia et al. | 361/687 |
| 5,781,409 | 7/1998 | Mercredy, III | 361/687 |
| 5,796,581 | 8/1998 | Mok | 361/687 |
| 5,822,187 | 10/1998 | Garner et al. | 361/687 |
| 5,828,552 | 10/1998 | Ma | 361/687 |
| 5,832,987 | 11/1998 | Lowry et al. | 165/86 |
| 5,847,925 | 12/1998 | Progl et al. | 361/687 |
| 5,880,929 | 3/1999 | Bhatia | 631/687 |

FOREIGN PATENT DOCUMENTS 272263 of 0000 Taiwan.

OTHER PUBLICATIONS

Mochizumi et al; "Hinged Heat Apes For Cooling Notebook PC's " Thirteenth IEEE SemiTherm Symposium, 1997, pp. 64–72.

A. Yu, "The Future of Microprocessors" IEEE Micro 1996 pp. 46–53.

*Primary Examiner*—Leo P. Picard
*Assistant Examiner*—Lisa Lea-Edmonds
*Attorney, Agent, or Firm*—Daniel P. Morris; Alvin J. Riddles

[57] ABSTRACT

Heat transfer through a heat pipe from a heat source on one side of a hinge to a heat dissipation capability on the other side of the hinge is achieved by providing a rotatable coupler with a thermal transfer body mounted on the side of the hinge away from the heat source and wherein a rotational interface surface area between the thermal transfer body and the heat pipe is larger than the outside of the heat pipe.

11 Claims, 7 Drawing Sheets

PORTABLE COMPUTER ROTATIONAL HEAT PIPE HEAT TRANSFER

FIELD OF THE INVENTION

The invention relates to the use of the heat pipe principle in an apparatus package in transferring heat from a heat source on one side of a hinge to a place on the other side of the hinge where the heat is to be dissipated; and in particular the invention relates to the technology of the use of the heat pipe principle in transferring heat produced at a semiconductor processor located in the base of a portable computer, past the cover hinge, to a dissipation capability located behind the display in the cover.

BACKGROUND OF THE INVENTION AND RELATION TO THE PRIOR ART

The heat pipe heat transfer system; wherein, in a sealed tube having a thermal transfer location at each end, a fluid undergoes multiple heat transfer mechanisms, such as evaporation, condensation and capillary action, inside the sealed tube, providing a highly efficient transfer of heat from one end to the other; has been used in the art in various applications. One serious limitation heretofore has been that a single sealed tube, however efficient the heat pipe is and however good the thermal transfer is at each end, does not lend itself very well to heat transfer between hinged portions of a container.

The limitation becomes even more of a consideration in some electronic apparatus where the sources of heat generation are becoming more concentrated such as with semiconductor chips, the packaging is becoming tighter due to weight and size for portability, and the packaging may have a hinge connecting essential parts of the heat disposal apparatus. As specifications in one portion of an apparatus become more rigorous, the flexibility in materials and structural arrangement in other portions of the apparatus take on increased importance.

The situation is illustrated in computers, particularly of the types known in the art as laptop or notebook. In these devices, efforts have been directed to providing as many features as possible in a small and light weight package.

The most efficient and physically rugged universal package that has evolved in the art is one in which the display screen portion is hinged on a base portion supporting a keyboard, away from the user; so that it can be positioned in the direct view of the user and in an essentially vertical position with respect to the keyboard when in use and can be folded down over the keyboard when not in use.

The thermal dissipation requirements of apparatus such as the electronic apparatus in portable computers are steadily becoming greater because of increasing processor performance and the addition of features, such as modems and audio capabilities. The increasing dissipation requirements are producing situations where heat generated locally must be dissipated over larger and remote areas unrelated to the portion of the package structure where it originated.

Electromechanical means such as fans can be helpful but carry considerations in packaging for the air flow, consume power and are noisy. In the problem, the main source of the heat, is usually a very compact element such as a semiconductor processor. There is seldom much flexibility in locating such heat sources as a processor. In dissipating heat, convection and radiation from surfaces that have a broad area and are vertical such as the area behind the display is usually more effective than horizontal surfaces such as the case for the base where the processor is usually located. As specifications on weight and performance become more demanding the need increases for an ability to be flexible in materials, in material and dimensional property selection, and in structural arrangements in thermal transfer in, the packaging.

The heat pipe principle, where a pipe with both ends sealed containing a relatively volatile fluid, has one end attached with minimum thermal loss at the heat source, and the other end attached with minimum thermal loss at a heat dissipator, transfers heat very efficiently by having the fluid boil at the heat source, condense at the dissipator and return inside the pipe to the heat source. Heat transfer rates greater than 100 times the conductivity of copper can be achieved with this transfer principle.

While there have been efforts in the portable computer art to apply the heat pipe principal in heat transfer from a semiconductor processor to a heat dissipator mounted behind the display, problems in connection with the hinge have resulted in less than satisfactory results.

In U.S. Pat. No. 5,588,483 a portion of the heat dissipator is wrapped around the heat pipe which has a portion positioned along the centerline of the hinge with thermal grease being used for heat transfer and as a lubricant for the movement of the dissipator around the heat pipe each time the cover is opened and closed.

In U.S. Pat. No. 5,646,822 the heat pipe transfer is achieved with two separate heat pipes, one from the heat source to the hinge and the other from the hinge to the dissipator wherein the heat pipe ends are positioned in a cylinder aligned along the hinge centerline and a thermal grease is relied on for heat transfer and for reducing friction.

SUMMARY OF THE INVENTION

Efficient and reliable heat pipe thermal transfer through a hinge in a hinged apparatus package, such as in a portable computer package, where the source of the heat is in one portion of the package, the base, and a heat dissipation capability is in another portion of the package, the cover, which in turn is attached by a hinge; is achieved through the use of a heat pipe from the heat source in the base to a rotational coupler mounted on the cover where the rotational coupler has provision for a larger surface area rotational thermal interface than that of the heat pipe. Highly efficient heat pipe heat transfer through the hinge while retaining flexibility in materials and structural arrangement is provided.

DESCRIPTION OF THE INVENTION

Figure 1:
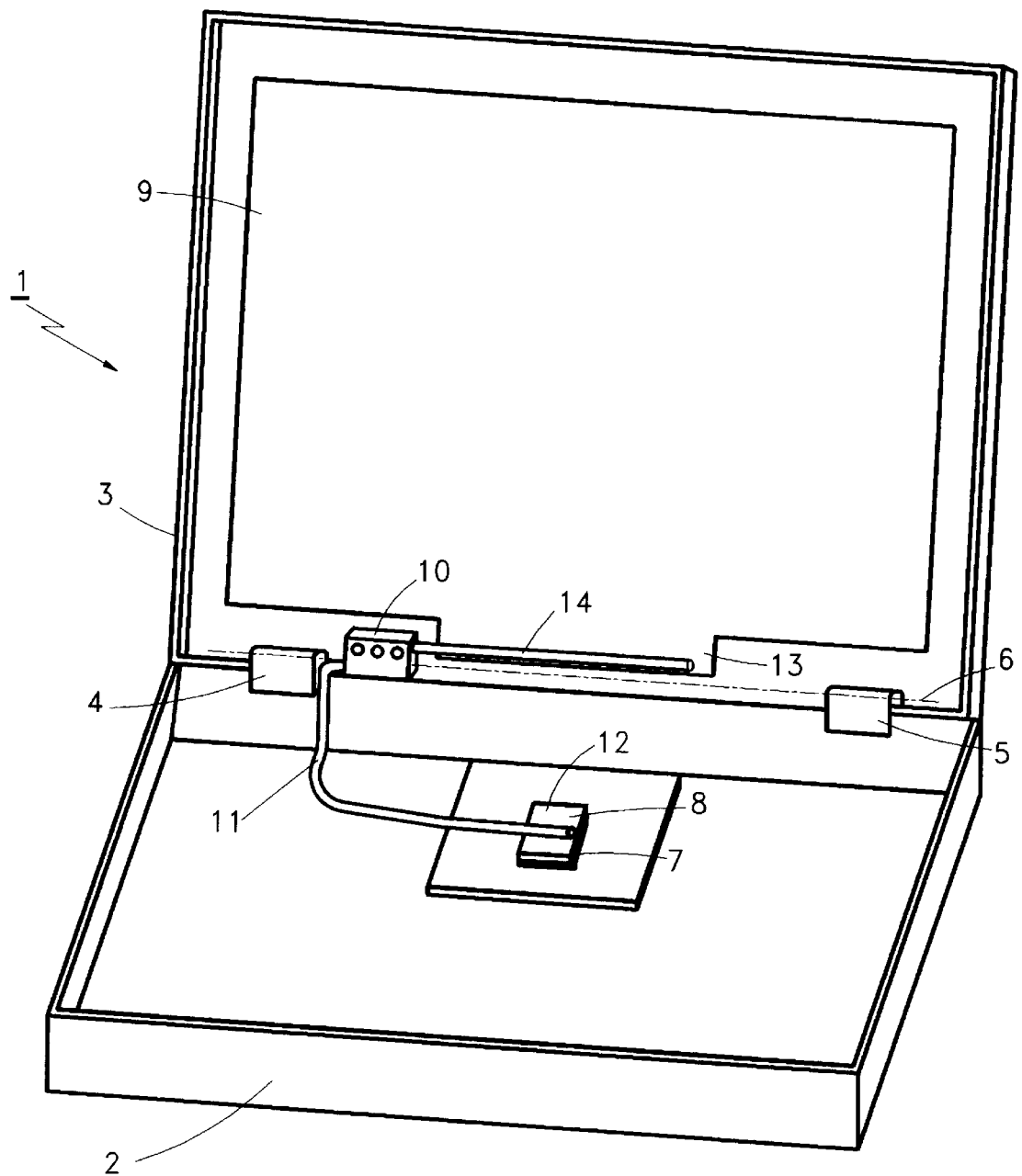
FIG. 1 is a perspective view of the base and hinged cover sections of a portable computer package with a heat pipe thermal transfer between a semiconductor processor mounted in the base section and a broad area heat dissipation capability mounted in the hinged cover section, illustrating the hinge centerline rotational alignment and the coupler mounted on the cover section.

In accordance with the invention an increased efficiency and reliability transfer of heat between a heat source mounted in one portion of a package and a heat dissipation capability mounted on a hinged portion of the package is achieved through the use of a heat pipe for conveying heat from the heat source through a rotational coupler that has the rotation aligned with the hinge axis, mounted on the hinged portion of the package and which involves a larger rotational surface area than that of the heat pipe in the coupler. With the structure of the invention heat is conducted with all the efficiency of the heat pipe principle through the hinge while preserving many aspects of structural and material flexibility.

The invention has particular usefulness in and is described in connection with the hinged cover packaging of a portable computer.

In the invention there is a heat pipe that goes from a localized heat source such as a semiconductor processor located in the base of a portable computer package to a heat dissipation capability on the hinged cover behind the display screen; through a rotational coupler mounted on the cover with heat transfer in the rotational coupler employing a larger surface area than the heat pipe and with rotational alignment along the centerline of the hinge. The rotational coupler has construction and thermal transfer features for coupling into a wide variety of heat dissipating capabilities.

The rotational coupler is designed for rotatable maximum heat transfer between an end of a sealed heat pipe and a broad area heat dissipation capability through a hinge so as to accommodate a wide variety of broad area heat dissipation structures and materials. In accordance with the invention means are provided for rotational thermal transfer through a surface area that is larger than the surface area of the outside of the end of the heat pipe. As examples of such structural and material dissipation flexibility, the cover itself can be of metal; a dissipator member on the cover can be a wide range of materials i.e. Copper, magnesium, aluminum; and the thickness of the dissipator can vary, from too thin to be self supporting, to any thickness that is within the clearance behind the display. In the coupling of the heat pipe in a heat transfer, better efficiency is achieved where all the heat delivered at the sealed end of the heat pipe is focused for transfer as much as practical into the body of the coupler for flexibility in further transfer to the dissipation capability.

Heat pipes transfer heat satisfactorily with various types of external tubing. Usually the tubing is of high thermal conductivity such as copper. The outside surface of the tubing is usually as small as the desired heat transfer specifications for the heat pipe will permit. Attachment of the heat pipe ends to the source of the heat and to a large area rotational part in the coupler is done with a fused metal interface such as with various forms of welding or with solder. Where solder is employed, since solder has a lower thermal conductivity than copper, a close diameter clearance match and full contact area wetting, minimizes loss in heat transfer. Rotational friction is also minimized with use of the thermally conducting grease or oil used in the art. As an illustrative example, with a copper heat pipe having an outside diameter of about 3 millimeters, a clearance of 15 to 25 micrometers difference in outside to inside diameters is satisfactory. Resilient seals such as "O" rings can be made of neoprene.

Referring to FIG. 1 there is shown a perspective view of the base and hinged cover sections of a portable computer with a heat pipe thermal transfer between a semiconductor processor mounted in the base section and a heat dissipation capability involving the cover section illustrating the hinge centerline aligned rotational heat pipe coupler mounted on the cover. An advantage of mounting the coupler in the cover is that the body of the coupler can permit coupling to a location behind the display, where different structural and material considerations in dissipation capabilities may be involved. For simplicity the heat dissipation capability is shown as a relatively thin separate element in the cover although it will be apparent that the element could be so thin as not to be self supporting, that broader thermal transfer to it may be needed, and the cover itself could be made of metal for service as a dissipator.

In FIG. 1 the portable computer is labelled element 1 wherein for clarity of explanation the components not directly involved in the invention, such as the display, keyboard and disk drive are not shown. The base is labelled element 2, the cover is labelled element 3 and the hinges are labelled elements 4 and 5. The centerline of the hinges 4 and 5 is depicted by the dashed line labelled element 6.

In the base section 2 a semiconductor processor 7 is a heat source and is positioned under a heat spreader 8. In the cover 3 a heat dissipation capability is located that can take heat delivered by the heat pipe 11 for transfer to the environment. In this illustration the heat dissipation capability is shown as a heat dissipator 9 positioned on the inside of the cover 3 behind a flat panel display, not shown. A rotational coupler 10 is mounted on the cover 3 with the end of the heat pipe 11 in a bore in the body of the coupler 10. The bore in the body of the coupler 10 occupied by the end of the heat pipe 11 will accommodate rotational thermal transfer of the heat carried by the heat pipe 11. The other end of the heat pipe 11 is attached through a good thermal contact, such as by fusion, at 12 to the heat source 7. The body of the coupler 10 is of a high thermal conduction material including, as examples, copper and aluminum. The bore in the coupler 10 that is occupied by the end of the heat pipe 11 is positioned along the centerline 6 of the hinges 4 and 5.

While the heat dissipation capability is illustrated as a broad area sheet of metal of, for example copper or aluminum, labelled element 9 that is mounted on the cover 3 it will be apparent that the cover itself could serve if made of sufficiently thermally conductive material and weight limitations could be met.

The element 9 in this illustration has a portion 13 that extends for facilitating thermal coupling to an attachment conveying the heat at the coupler 10. The attachment is illustrated for example as another heat pipe 14. The heat pipe 14 has one end with a fusion connection into the bore in the coupler 10 and the other end with a fusion connection to the portion 13 of the dissipator 9.

In operation, heat from the processor 7 is transferred at the fused thermal connection 12. It is transported with heat pipe efficiency through the heat pipe 11 to the rotational coupler 10 where the heat is transferred through heat pipe 14 to the dissipator 9 located in the cover 3.

When the hinged cover 3, which can travel through an arc of 180 degrees, is moved on the hinges 4 and 5, the end of heat pipe 11, in the bore in the rotational coupler 10 along the centerline 6, rotates in the bore.

The structure of the invention provides the option of dumping heat at the coupler or carrying it beyond.

From the rotational coupler 10 the heat that has been transported in the heat pipe 11 is then thermally coupled as tightly as practical into the dissipation capability which may be by further heat pipes, as illustrated by heat pipe 14, or by conduction and radiation as will be further described, while still accommodating rotation as the cover 3 is moved and minimizing thermal resistance.

The end of heat pipe 11 that enters the body of the coupler 10 is provided with a larger surface than the surface area of the heat pipe itself. This feature is provided by having a longer heat transfer surface or having a larger diameter heat transfer surface. The larger diameter occurs when the heat pipe 11 end is fused into a sleeve that has a diameter greater than the heat pipe itself and is positioned around the heat pipe in the bore. "O" ring type or other resilient seals are used to keep a thermal grease or oil that is used to reduce rotational friction from escaping and to minimize thermal resistance at the surface of the bore.

In accordance with the invention the combination of the heat pipe, the rotational coupler with the larger surface area heat conducting interface and the mounting of the rotational coupler in the cover with the larger surface area interface being aligned with the hinge axis in combination, provides added construction flexibility in the coupling of heat into the dissipation capability.

Figure 2:
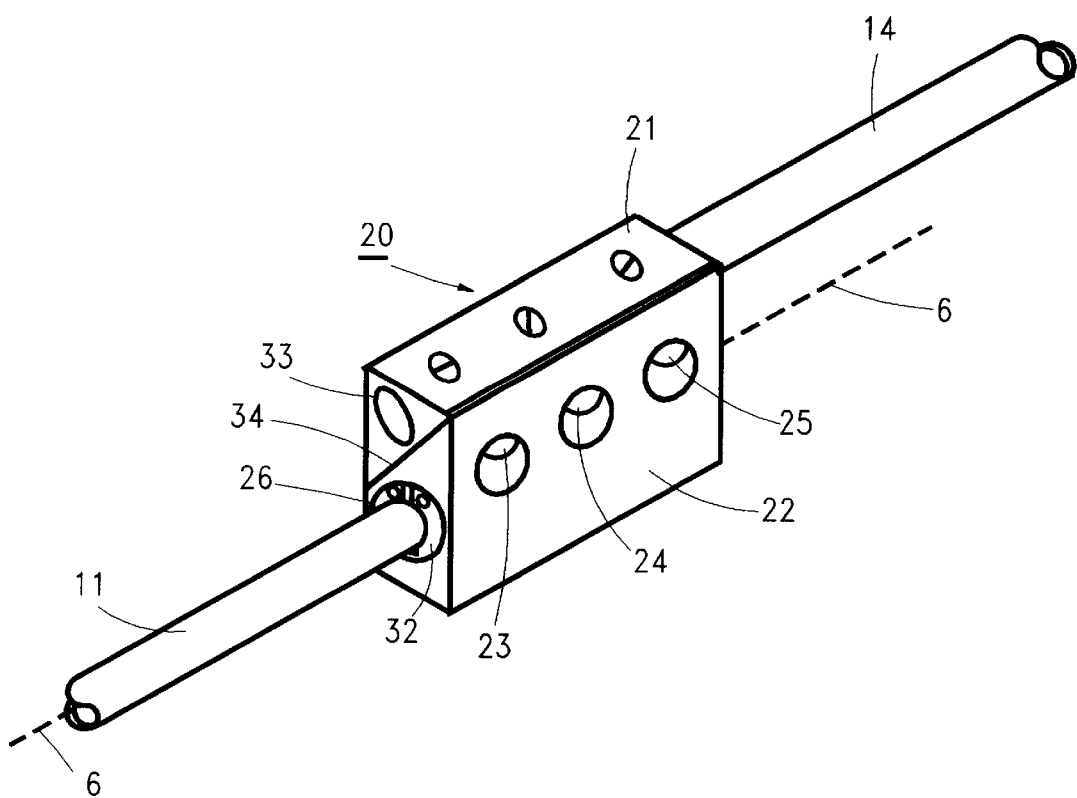
FIG. 2 is an isomeric view of a multiple body piece rotational heat pipe coupler.
Figure 3:
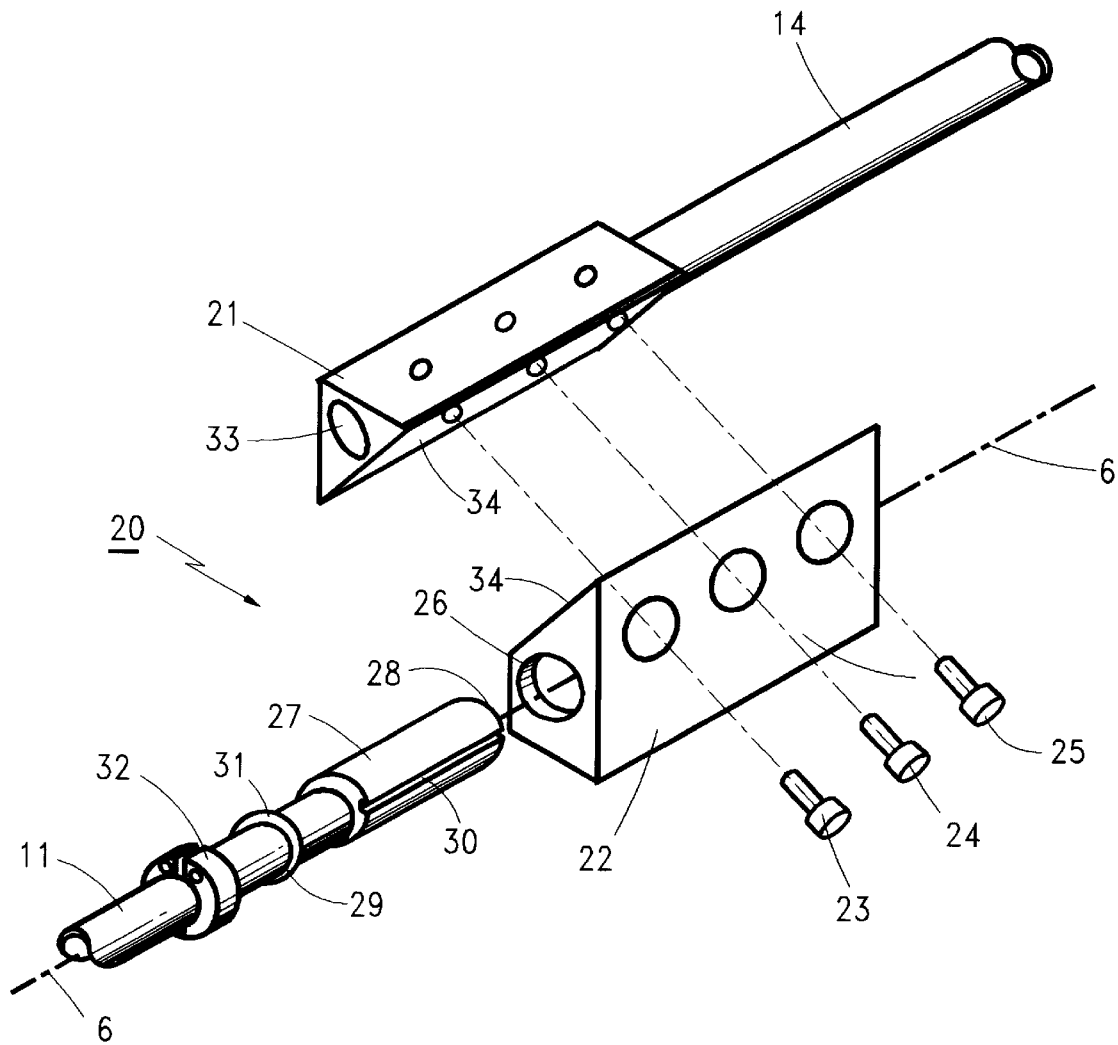
FIG. 3 is an expanded view of the interrelationship of the parts of the multiple body piece rotational heat pipe coupler of FIG. 2.
Figure 4:
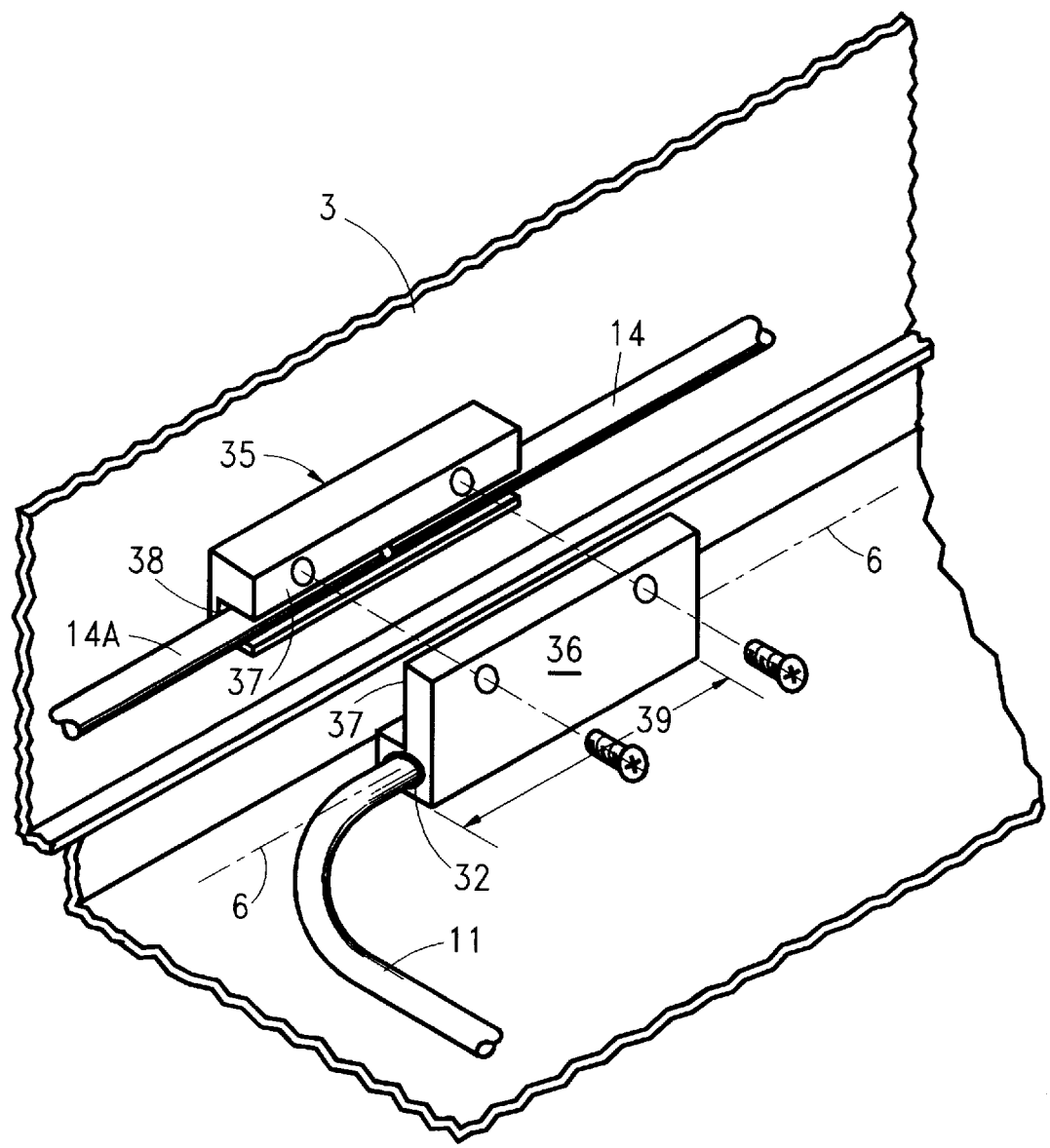
FIG. 4 is a depiction of the interrelationship of the parts of a separable part coupler illustrating rotational coupling, bolting attachment and clamping capability of dissipator and dissipator heat pipes.

In FIGS. 2, 3 and 4 there are shown isomeric and expanded views of couplers the pieces of which can be disassembled.

In FIGS. 2 and 3 a rotational coupler is shown with a two piece coupler body that can be taken apart for ease of computer assembly and repair. The body is element 20 having parts 21 and 22 that can be removably fastened together, for example with screws 23,24 and 25.

In part 22 there is a bore 26, with an accommodating diameter for a rotor 27, visible in FIG. 3, that surrounds and is fused or soldered to the sealed end portion of the heat pipe segment 11. The bore 26 ends, out of sight in both figures, so that the end 28 of the rotor will be approximately 1 millimeter before breaking through part 22 and thus is essentially in contact with the part 22 for added thermal transfer. The rotor 27 is made of a good heat transfer material such as copper and is fused or soldered to the sealed end of the heat pipe 11 with a 25 to 50 micrometer clearance between the outside diameter of the heat pipe 11 and the inside diameter at 29 of the rotor 27. The rotor 27 is provided with a groove 30 to accommodate the thermal grease or oil and to serve as a grease or oil reservoir in service. The rotor 27 could be an extruded portion of the heat pipe 11. A resilient seal 31 such as an "O" ring fits around the heat pipe 11 and against the inside diameter of the bore 26, and a retaining ring 32 that permits rotation of the heat pipe 11 while retaining position by expansion against the inside periphery of the bore 26, are provided. When the body of the coupler 10, which is the part 21, is mounted on the cover 3 the bore 26 is positioned to be aligned with the centerline 6 of the hinges 4 and 5. The heat transfer from the part 22 to the dissipation capability is the through the second part 21 and the heat pipe 14. The end of the heat pipe 14 is fused or soldered into the bore 33 in the part 21 with the clearances used with the other parts.

It should be realized that although in two bore, two heat pipe, couplers there will be the least thermal resistance where the bores are parallel; it is not however essential for them to be parallel and so long as the bore with the larger rotation interface is aligned with the hinge axis the other bore could be at any angle, for example orthogonal.

The interface 34 between parts 21 and 22 is at an angle so that the block made up of parts 21 and 22 can be separated to facilitate removal of the cover 3 at the hinges 4 and 5 for repair and maintenance operations on the portable computer.

Referring to FIG. 4 there is a depiction of the interrelationship of the parts of a separate part coupler illustrating rotational coupling, fastening and clamping capability of dissipator and dissipator heat pipes.

In FIG. 4, where the same reference numerals as in earlier figures are used as appropriate, the coupler is made up of parts 35 and 36 that can be fastened together with screws extending into the cover 3 when desired. Part 36 has the rotational coupling capability with the end of the heat pipe 11 in the bore, aligned with the centerline 6 and retained by the retainer 32 with a resilient seal such as an "O" ring that is out of sight inside the bore. The parts 35 and 36 have an interface 37 where the parts come into contact when fastened together that can serve as a clamp that will retain and transfer heat to thin dissipators such as 9 in FIG. 1. In part 35 a groove 38 may also be provided into which a further dissipation heat pipe 14A is positioned and is clamped together with heat pipe 14 between the parts 35 and 36. The dissipator heat pipe 14A can follow the periphery of a dissipator such as 9 with contacting continuously or periodically as desired for lower resistance heat transfer to a wider area. The part 35 is capable of use alone as a block attached to the cover and aligned with the hinge axis 6 at any selectable location for coupling a heat pipe to a location on a dissipator such as 9.

Alternatively, the functions of parts 35 and dissipator 9 may be combined in one integral part further reducing thermal resistance between the heat pipe 11 and the dissipation capability.

The feature of having increased surface area on the rotating end of the heat pipe 11, in addition to a sleeve inside the bore in part 36, can be achieved by having the end of the heat pipe 11 extend further along dimension 39 inside the bore.

Figure 5:
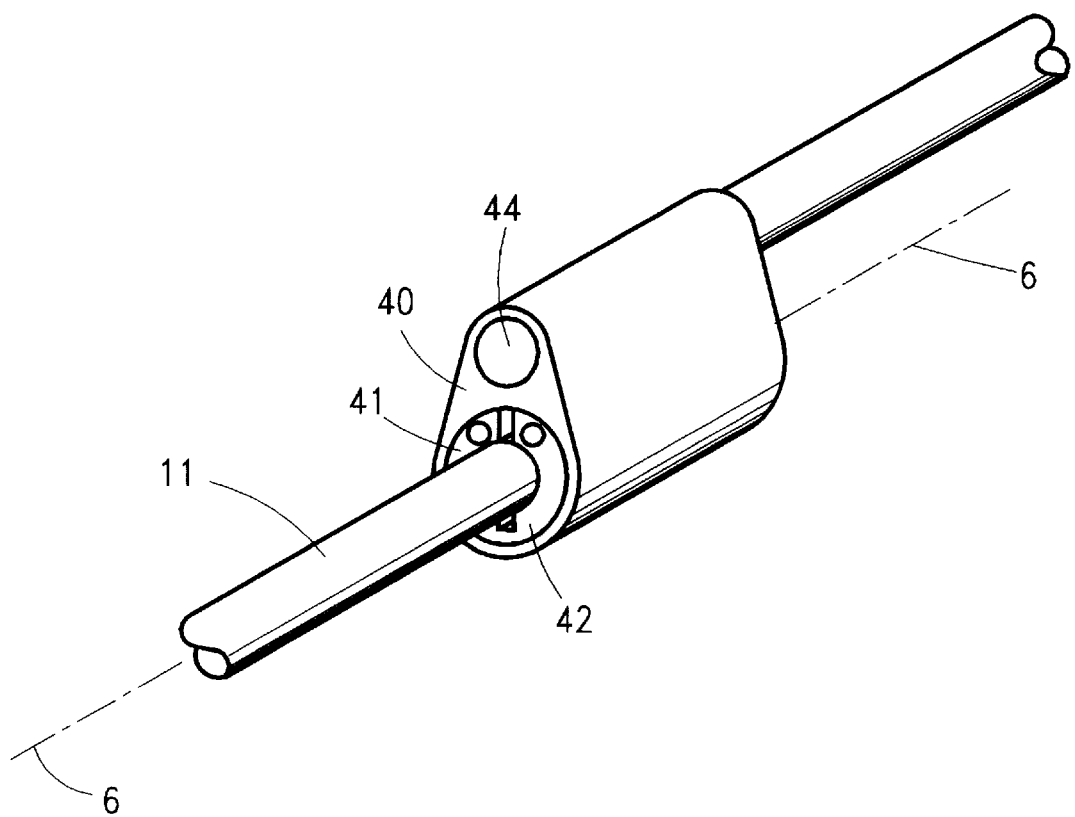
FIG. 5 is an isomeric view of a single body piece rotational heat pipe coupler.

In FIG. 5 an isomeric view is provided of the rotational coupler that occupies a small space. Referring to FIG. 5 where like reference numerals with those in FIGS. 2 and 3 are used where appropriate, a single block 40 has a larger bore 41 for the heat pipe 11. The bore 41 contains a rotor fused to the heat pipe 11 and a resilient seal such as an "O" ring behind the retaining ring 42. The assembly is made like that in the bore 26 of FIGS. 2 and 3 with close clearances for the diameters and at the end. The separation between the bore 44 for heat pipe 14 and the bore 41 can be as close as tolerances will permit. The heat pipe 14 can be arranged to come out the same end of the coupler as heat pipe 11. When mounted in the cover the bore 41 is aligned with the centerline 6 of the hinges.

There may be a situation in the practice of the invention such as handling heat from more than one heat source, when it would be advantageous to be able to bring more than one heat pipe into or out of the rotational coupler.

Figure 6:
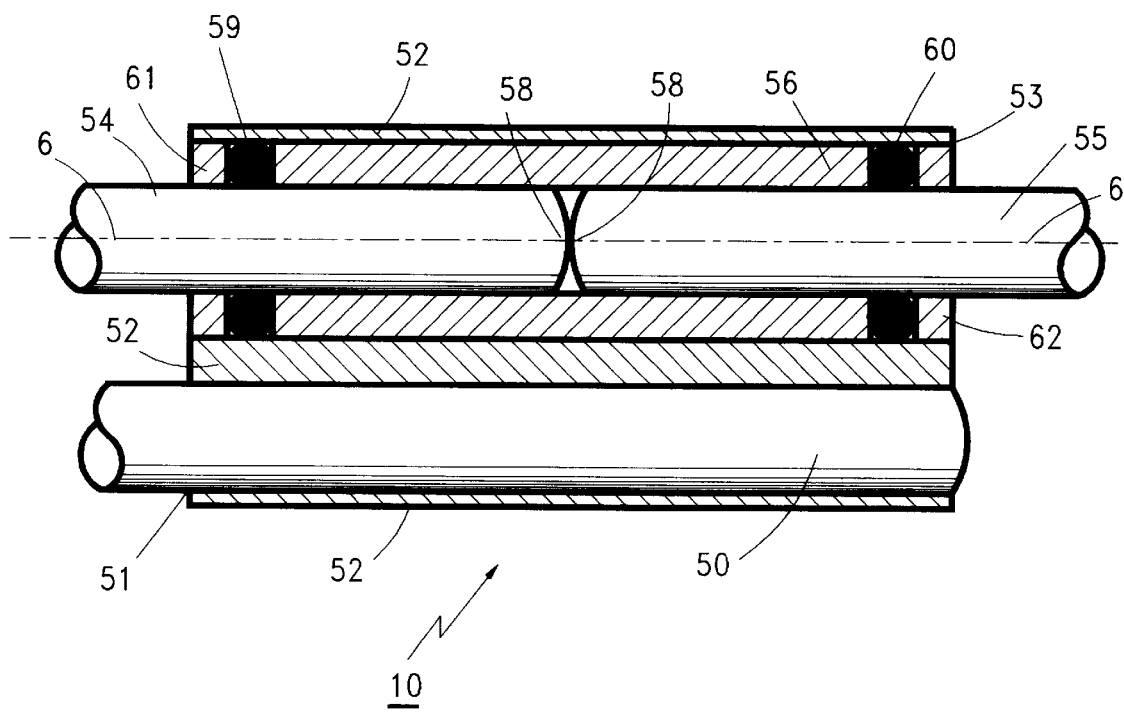
FIG. 6 is a section view through the center of a three heat pipe rotational heat pipe coupler.

Such a situation is illustrated in FIG. 6 wherein there is shown a one heat pipe that is joined in the rotational coupler to two other heat pipes. Referring to FIG. 6 a heat pipe 50 is fused or soldered with appropriate diameter proximity and clearance into bore 51 in the coupler 10 body block 52 which also has a through bore 53 for two colinear heat pipes 54 and 55 inserted from opposite ends and which will rotate around the centerline 6 of the hinges when the coupler 10 is mounted on the cover 3. The bore 53 has a diameter that will accommodate a sleeve type rotor 56 that is soldered or fused, with appropriate diameter proximity and clearance, to both heat pipes 54 and 55 the ends 57, 58 of which are in contact for thermal transfer in the sleeve rotor 56.

A groove, not shown, can be provided in the sleeve rotor 56, similar to element 30 in FIG. 3 to serve for thermal grease or oil overflow and as a thermal grease or oil reservoir. Resilient seals such as "O" rings 59 and 60 are provided to contain the grease or oil and to minimize heat loss. Retaining rings 61 and 62 providing friction on their outside diameters against the block 52 hold the assembly in place.

It has been found in accordance with the invention that having a larger surface area for the rotational thermal transfer provides an improved heat transfer. In some of the previous figures this feature has been illustrated with a larger diameter rotor member fused to one heat pipe and with increased length of the heat pipe in the rotational bore.

Figure 7:
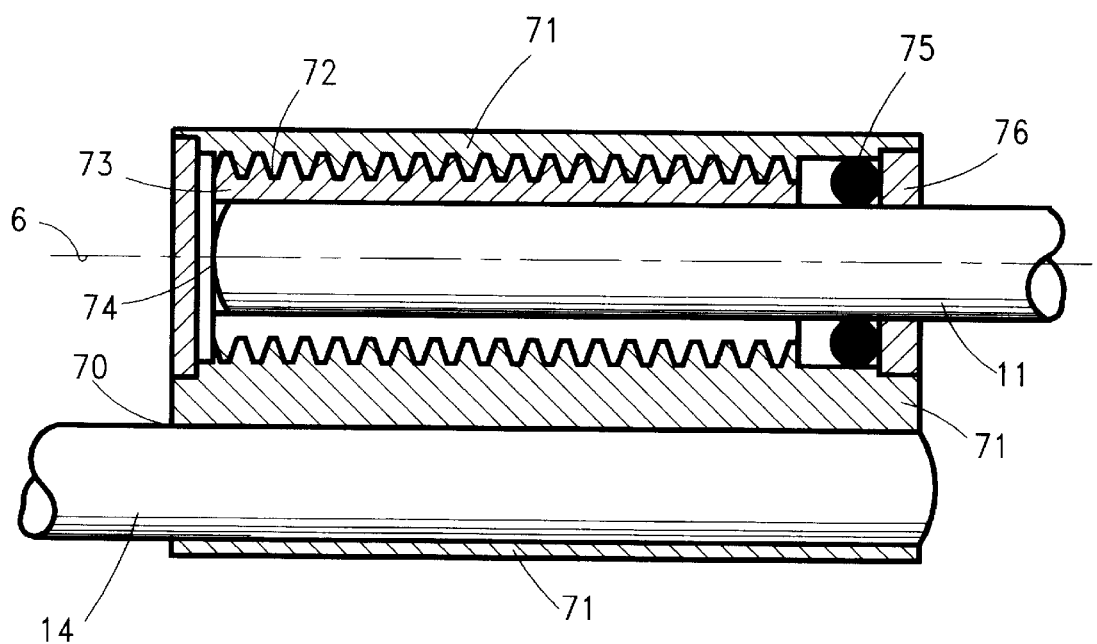
FIG. 7 is a section view through the center of a threaded interface in a rotational heat pipe coupler.

In FIG. 7 there is a further illustration of added surface area in the rotational interface between the first and second heat pipes through the added surface that is achieved with a threaded structure.

Referring to FIG. 7 there is a bore 70 in the block 71 in which a heat pipe corresponding to element 11, is fused or soldered with appropriate diameter proximity and clearance. A larger bore 72 with the inside surface threaded, is placed in the block 71. The inside diameter of the bore 72 is large enough to accommodate a threaded rotor 73, which in turn is fused with appropriate diameter proximity and clearance to the outside diameter of the sealed end of the second heat pipe to the dissipation capability corresponding to element 14. When mounted in the cover the assembly can rotate around the centerline 6 of the hinges. In the bore 72 there is provided sufficient linear clearance to permit linear travel of the threaded rotor 73 as the cover changes position. The cover travel is at maximum a 180 degree arc so that a linear clearance 74 of ½ the thread pitch would be satisfactory. A thermal grease or oil is included for minimizing friction in the threaded interface. The grease or oil is retained with a resilient seal 75 such as an "O" ring and the assembly is held in place with retaining ring 76 that provides friction on the outside diameter against the block 71.

What has been described is the heat pipe transfer of heat from a heat source positioned on one side of a hinge to a heat dissipation capability positioned on the other side of the hinge by providing a coupler mounted on the side of the hinge away from the heat source, the coupler having a larger rotational interface than the heat pipe itself and that is aligned with the axis of the hinge.

What is claimed is:

1. In a heat pipe transfer of heat between a source of heat mounted in the base member of a portable computer and a heat dissipating member located in a cover member of said portable computer and wherein said cover member is attached to said base member through a hinge, the improvement compromising in combination:

a rotational thermal coupler member having first and second parallel bores,
said first of said parallel bores being positioned along the axis of said hinge and having a size able to accommodate an increased surface area of an end region of a heat pipe,
a first heat pipe having one end attached by fusion to said source of heat and having the remaining end in good thermal contact in said first of said parallel bores, and,
a second heat pipe having one end attached by fusion to said heat dissipating member and having the remaining end attached by fusion in said second of said parallel bores.

2. In heat pipe transfer of heat, between a source of heat and a dissipator for that heat, that are separated by a hinge of an apparatus housing, the improvement comprising:

a rotational coupler having first and second parallel bores,
said first of said parallel bores being aligned with the axis of said hinge of said apparatus, and
said first of said parallel bores having a size that will accommodate a larger surface area rotational interface than the surface area of an end region of a heat pipe,
a first heat pipe member having one end attached by fusion to said source of heat and having the remaining end region positioned in said first of said parallel bores in said rotational coupler, and,
a second heat pipe member having one end attached by fusion to said dissipator and having the remaining end attached by fusion in said second of said parallel bores in said rotational coupler.

3. The improvement of claim 2 wherein said rotational coupler has essentially parallel sides and a separate interface between said first of said parallel bores and said second of said parallel bores.

4. The improvement of claim 3 wherein said interface is at an angle with respect to said sides.

5. The improvement of claim 3 wherein said interface is parallel to said sides.

6. A portable computer of the type wherein a cover part is hinged on and can be folder over a base part, the improvement for transfer of heat by a heat pipe from a processor mounted in said base part to a broad area heat dissipator mounted in said cover part, comprising:

means for fusion attachment of a first end of a first heat pipe to a semiconductor processor positioned in said base part,
means for fusion attachment of a first end of a second heat pipe to a broad area heat dissipator positioned in said cover part, and,
means for thermally coupling the remaining end region of said first heat pipe and the remaining end region of said second heat pipe in a rotational coupler,
said rotational coupler having parallel first and second heat pipe end accommodating bores in a thermal transfer body, wherein,
the first of said parallel bores into which said second end of said first heat pipe is positioned is aligned with the centerline of said hinge of said cover part and has a size to accommodate a larger area heat pipe to body thermal transfer than the area of the end region of said second end of said first heat pipe, and,
the second of said parallel bores into which said second end of said second heat pipe is positioned has a size for attachment of the end region of said second end of said second heat pipe to said body by fusion.

7. The portable computer of claim 6 wherein said larger thermal transfer area size of said first of parallel bores is achieved through a larger diameter and through one of the use of a rotor, a sleeve and a threaded member attached by one of fusion and soldering to said second end region of said first heat pipe.

8. The portable computer of claim 7 including an "O" ring and retaining ring combination positioned at the surface of said larger diameter bore and surrounding said second end of said first heat pipe.

9. The portable computer of claim 8 where said increased surface area feature involves a sleeve that surrounds and is fused to the end of opposing heat pipe segments.

10. The portable computer of claim 9 wherein said sleeve is threaded and is positioned in a threaded said larger diameter bore.

11. The portable computer of claim 10 wherein said thermal transfer body has two detachable pieces.

* * * * *